United States Patent Office 3,284,778

Patented Nov. 8, 1966

3,284,778

PROCESSOR SYSTEMS WITH INDEX REGISTERS FOR ADDRESS MODIFICATION IN DIGITAL COMPUTERS

Heinz Trauboth, Grosshesselohe, near Munich, Germany, assignor to Siemens & Halske Aktiengesellschaft, Munich, Germany, a corporation of Germany Filed Feb. 28, 1963, Ser. No. 261,597
8 Claims. (Cl. 340—172.5)

My invention relates to digital computers and more particularly to computer central processor systems equipped with index-register means for modifying the address section of commands for the program control of such computers.

In a programmed digital computer, the course of a computation depends upon a multiplicity of commands which are executed automatically in the proper sequence. The commands, arriving from an input signal transmitter, such as a punch-card scanner, are processed in the central processor system which comprises a memory for storing data and instructions, the means for performing computing and logic operations, as well as any necessary circuitry for feeding the ultimate results through the memory back to receiving or read-out devices.

Each command thus supplied to the memory of the central processor is a multidigit "word" which comprises a code section and an address section, such as a single-address section if the computer is of the single-address type. The operation-code section identifies the computing operation to be performed. The address section identifies the particular location or "cell" of the memory with whose data content the particular computing operation is to be performed. For flexible programming the processor should afford the possibility of automatically altering the address section of a command. In general, this is done either by substitution or by modification.

When applying substitution, the original address section is replaced by a new address. In this case, the original address is interpreted as the address of a new address. That is, the address section of the stored data content in the memory cell having the original address, constitutes the new address section of the command word. To effect such substitution, the address section of the command word, as a rule, comprises an identification, which may comprise a substitution digit or bit, stating whether or not substitution is to be made.

Modification of the address section in a command word can be effected by means of an index register. Registers are storage devices in addition to the main storage or memory of the processor system. The modification is performed by changing the original address with the aid of a calculating operation executed with a given number stored in one or more index registers. In most cases this is done by adding to the original address the number stored in the particular index register. For such purposes, the address section of the original command word contains an identifying instruction, which may comprise a modification digit or bit, which states whether or not modification is required and, when there are more than one index register, which particular index register is to be used.

In general, a relatively small number of index registers readily affords programming most computing programs. However, problems may be encountered in which a largest feasible number of index registers would be of advantage. Since index registers involve additional equipment and expense, the general practice is to employ a rather small number of index registers and to put up with the correspondingly more complicated programming then encountered for certain computer problems.

It is an object of my invention to afford a versatile and advantageous modification of the address section without, or with no appreciable, addition of index registers to the data storing equipment of the processor system.

To achieve this, and in view of the further objects and advantages of the invention mentioned hereinafter, I employ in the processor system of a program-controlled digital computer a desired number of memory cells in the main memory as an index register. I provide the command register of the processor system with an additional portion coordinated to a given number ($m$) of additional digit positions of the command word, this number ($m$) of digits being smaller than the total ($n$) of digit positions in the address stored in the respective memory cells used as index register. I further provide a separate register, which is the index address register, in which the remaining digit positions ($n-m$) of this address are stored.

In theory, all available localities of memory cells of the memory can thus be employed for index-register purposes, thus offering the same advantages as obtainable with a correspondingly large number of additional index registers. The number ($m$) of the additionally required digit positions in the command word is kept small by virtue of the fact that the content of these additional positions does not denote the entire address of the memory cells employed as index register, but only a portion of this address, whereas the remaining portion ($n-m$) of the address is stored in another register, namely the index address register. Preferably, the above-mentioned additional portion of the command register contains stored the ($m$) lowermost digits of the address of the memory cell employed as index register.

This will be elucidated by the following example. In order to prevent the command word from becoming too long, it is desirable to give the index address register more digit positions than are assigned to the additional digit positions of the command word. From this viewpoint, the additional digit positions in the command word may comprise, for example, $m=2$ decimal position, and the index address register may then comprise three decimal positions. On this basis, 100 memory cells can be employed as index register without requiring the index address register to be recharged. Such recharging, namely entering a new number for storage into the index address register, can be effected by a special command in known manner.

However, according to another feature of my invention, the index address register can also be recharged without special command. For this purpose, the command register is given a second additional portion containing ($q$) further additional digit positions in the command word which store in coded form the address of a memory cell with whose data content the information stored in the index address register can be modified. Therefore, the ($q$) additional digits in the command word identify definite cells in the memory whose memory content determines the content of the index address register. This also avoids destoring the content of the index address register in the event of a program interruption.

As mentioned, if the address of a command is to be modified, the address section of the command word, as a rule, contains a modification bit. This modification bit can be omitted in a processor system according to the invention if, for indicating that the address section of the command word is not to be modified, a given information contained in the ($m$) additional digit positions of the command word is used, this information being stored in the corresponding additional portion of the command register. Consequently, if in the additional portion of the command register there are stored the ($m$) lowermost digit positions of the address identifying the particular memory cell employed as index register, then all memory cells whose addresses possess the same lowermost digit values can no longer serve as index register. This is insignificant because virtually any large number of memory cells are available for use as index register. Similarly, other combinations of the (*m*) additional digits of the command word can be used for other purposes, for example for requiring that the address of the command word be modified with the data content of a command counter or accumulator. Those memory cells whose addresses then comprise the same lowermost digit values are then likewise no longer applicable as index register.

The invention will be further explained with reference to the drawing, which illustrates the essential components of computer central processors by respective block diagrams, the switches and other circuit means between the individual components of the processor system being omitted.

In order that the present invention may be readily carried into effect, it will now be described with reference to the accompanying drawings, wherein.

Figure 1:
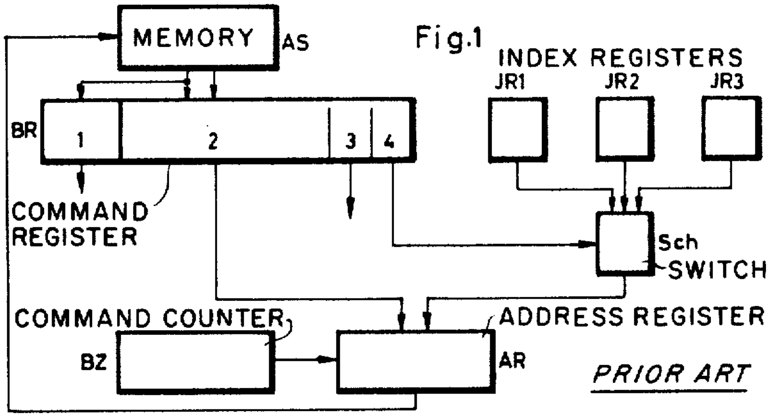
FIG. 1 is explanatory and shows diagrammatically a central processor system of known type.

The central processor for each computer of the type here involved comprises a memory AS (FIG. 1) affording a high speed of access to the stored data. The commands to be executed by the computer and the data necessary therefor are stored in the memory prior to commencing a computing operation. The memories most frequently used are magnetic core assemblies and magnetic drums. Such and other memory devices, as well as the various other individual components of the systems here described, are known and commercially available as such. If desired, reference may be had, for example, to volumes 3 to 6 of Computer Basics, published 1962 by Howard W. Sams & Co., Inc., Indianapolis, Indiana; and to the article series published since 1961 under the title "Computer Equipment Comparison Series" in Control Engineering, as well as to the references to suppliers and literature contained in that series.

The processor systems described in this specification by way of example are of the single-address type. In such systems the commands, as a rule, are stored in the sequence in which they are to be executed. The individual commands are called up by means of a command counter BZ (FIG. 1) whose position for a normal sequence of the commands is in accordance with the address of the one memory location or cell which stores the particular command to be performed. As soon as the command is fully executed, the counter BZ advances one step, and the next command is called up and executed. During such performance the following individual operations take place.

Upon execution of a command, the command counter BZ, after having switched one step forward, transfers its count into an address register AR correlated to the memory AS. The address register AR occupies a corresponding cell of the memory AS, and the information stored in that cell, representing the command next to be performed, is transferred into a command register BR.

The command register BR comprises a portion 1 for the operation-code section of the command word which is decoded in portion 1 and subsequently causes the corresponding computing operation to take place in the computing devices proper. The command register has further portions 2, 3 and 4 which jointly serve to receive the address section of the command word. The register portion 2 stores the address proper. The register portion 3 stores the identifying digital information indicating whether or not a substitution in the original address is to be made. The portion 4 of the command register stores the indication as to whether or not modification is called for.

First, it is assumed that the command words stored in the command register BR are such that no modification and no address substiution is called for. In this case, the address is transferred from portion 2 of the command register BR to the address register AR, the corresponding cell in the memory AS is occupied, and its contents are transferred to a computer (not shown) where they are processed in a known manner in accordance with the operation-code portion of the command word, which has, in the meantime, been decoded. After the completion of the computer operation, the count of the command counter BZ, which has, in the meantime increased by 1, is transferred to the address register AR and the operation is repeated.

If the substitution information is suitably stored in the portion 3 of the command register BR the address portion of the command is substituted, in a known manner, one or more times until the substitution position of the command indicates that no further substitution is to take place. The further operations then continue as already described.

However, if in portion 4 of the command register BR the stored modification position calls for modification, the address of the command is modified by a calculating operation with the aid of an index register identified in the modification digit position. Normally, the information stored in the particular index register, having a number of digits equal to those in the address of the command word, is added to the address, any resulting overstored in the index register JA–R is transferred to the modification placed in decimal code is occupied by 0, no index-register modification will take place. The switch S*ch* in this case does not connect with any of the index registers JR1 to JR3. When the modification position is occupied by the digit value 2, when the switch S*ch* closes the connection with the index register JR2. The stored content of this index register is added to the address of the command word transferred from portion 2 of the command register BR into the address register AR. The memory cell identified by the thus modified address is occupied in the memory AS and the data content of this memory cell is transferred to the computing mechanism.

In the known computers where modification of the address takes place in accordance with the above-mentioned principle, the central processor requires additional index registers, each having a relatively large number of digit positions and involving a considerable increase in equipment and investment. Furthermore, in the known computers each command affords only one index-register modification of the command address.

Figure 2:
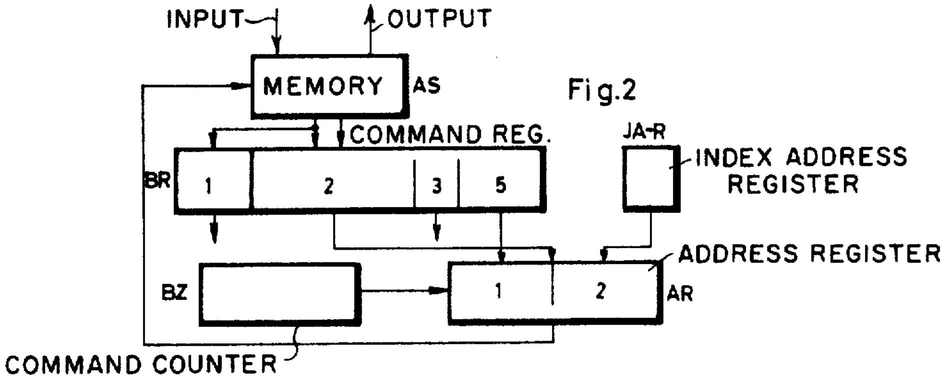
FIG. 2 is an embodiment of a processor system of the present invention.

The process system according to the invention shown in FIG. 2 is illustrated in the same manner as the known system shown in FIG. 1 to facilitate comparison. As in the known processor systems, the processor system of FIG. 2 comprises a memory AS, a command counter BZ, a command register BR and an address register AR. However, there are no additional index registers corresponding to those denoted by JR1, JR2, JR3 in FIG. 1, because according to the invention a number of cells in the memory AS are employed as index register. Only an additional register of a small number of digit positions, namely an index register JA–R, is provided.

The address section of the command word to be used for the purposes of the invention comprises an *n*-position address proper, a substitution-denoting position, a modification position, and (*m*) additional digit positions. The (*m*) additional positions contain a portion of the address for the memory cell that is to serve as index register for a particular command. This partial address of the memory cell is preferably constituted by the (*m*) lower digit positions of the cell address. The (*n–m*) remaining positions of the cell address, preferably constituting the (*n–m*) upper digit positions, are stored in the index register JA–R. If a given combination of the (*m*) additional digit positions, for example the combination 00 . . . 0 of the command word is used for indicating that the address section of the command is not to be modified, the modification position can be omitted. This is assumed, by way of example, to be the case in the following explanations. The memory cells whose address contains these same lower digit values are then not applicable as index register.

If, according to the identifying bits in the command word, neither a substitution nor a modification in the address is to be performed, or if only a substitution is to take place, the operations proceed in the same manner as in the known system according to FIG. 1. The index address register JA–R does not enter into action in either of these modes of performance.

However, if an address modification is called for, the following operations are performed. The setting of the command counter BZ is transferred into the address register AR. The corresponding memory cell in memory AS is occupied and its data content is taken into the command register BR. The operation-code section of the command is thus transferred into portion 1 of the command register BR, and the address section into the portions 2, 3 and 5 of the command register BR. At this stage, the address proper is stored in portion 2 of the command register, the substitution digit position is stored in portion 3, and the additional ($m$) digit positions of the command word are stored in portion 5. Assume that now in portion 5 of the command register BR the stored combination differs from 00 . . . 0 which, as mentioned, serves to indicate that no modification is to take place. Under these conditions the data content stored in portion 5 of the command register is transferred to portion 1 of the address register AR. The additional information stored in the index register JA–R is transferred to the portion 2 of the address register AR. Consequently, portions 1 and 2 of the address register then jointly store the address of the cell in memory AS to serve as index register. This memory cell is occupied, and the address section of the command word stored in the command register BR is modified with the content of the cell. Preferably, the ($m$) additional positions and the substitution position, that is the total information data stored in portions 2, 3 and 5 of the command register, are modified simultaneously. In practice, the entire command register is changed with each modification, while the previous data content is first secured in special registers which, for simplicity, are not shown in the schematic diagrams of FIGS. 1 to 3.

For modification and identification of given criteria, all portions 1, 2, 3 and 5 of the command register BR can be drawn upon, in contrast to the known processor systems in which only a register corresponding to the address portion (2 in BR) is available for this purpose. This results in the advantage that, contrary to the known computing systems, a repeated modification is available; namely, if the new ($m$) additional positions again exhibit a combination different from 00 . . . 0, these positions are again taken into portion 1 of the address register AR and the information stored in the index address register JA–R is again transferred into portions 2 of the address register AR, the cell of memory AS designated by the second new address being then occupied and the address section of the command word being again modified with the address section of the stored content of the cell. This is repeated until the ($m$) additional positions of the command word exhibit the combination 00 . . . 0 and thus indicate that no further modification is to take place. Now the address of the command word stored in portion 2 of the command register BR is transferred into the address register AR, the corresponding cell in memory AS is occupied and its content is transmitted to the calculating mechanism. After performance of the corresponding calculating operations, the then changed setting of the command counter is transferred into the address register AR, and the above-described operations are repeated. Of course, the repeated modification may be omitted. In this case, only the command address stored in portion 2 of the command register BR is modified with the stored content of the memory cell serving as index register, then the cell identified by the modified address is occupied through the address register AR and the cell contents are fed to the calculating mechanism. Independently thereof, any substitution operations take place in the known manner if the substitution position stored in portion 3 of the command register BR calls for such action.

In practice, the number ($m$) of additional positions is preferably kept considerably smaller than the number ($n$) of positions in the address section proper, for example: $m=2$ and $n=5$ decimal positions which, if desired, may be applied in a binary subcode. In this case $10^2-1$ memory cells can be used as index register without requiring recharging of the index address register JA–R. By recharging the index address register, all memory cells, with the exception of those exhibiting 00 in the last two digit positions, can be used as index register. The recharging of the index address register JA–R can be effected by special command. However, according to the invention, the index address register JA–R may also be recharged automatically. This will be further explained after dealing with matters of word length.

It may appear that the use of memory cells for address modification must result in longer command words and consequently require larger memory equipment because the word length in a computer is generally always the same for commands, numerical values, alpha-numerical terms and other data. However, no increase in memory size need be encountered, particularly with the single-address computers mainly employed. The word length in a computer, as a rule, is determined by the number of digits in the numerical values to be processed. A suitable word length for example is thirteen decimal positions so that a twelve-position decimal number with a positive or negative sign can be represented in a single word. As a rule, no numerical values of more decimal positions are to be processed. Under such conditions, there are likewise thirteen decimal positions available for the command word. With a maximum of five positions for the address, the address section in the command word in a known computer comprises for example seven positions; five address positions, one substitution position and one modification position. The operation-code section of the command then consists of six positions such as, for example, one sign position, one marking position and one rounding-off position, three operation positions. The operation section of the command word therefore comprises a rather large redundance. That is, the command word could be considerably shorter if thirteen decimal positions were not anyhow available.

Consequently, when providing, for example $m=2$ additional positions, the redundance of the operation-code section can be reduced so that the number of digit positions in the total command word need not be increased. The command word then consists, for example, of an eight-position address section. This may comprise five address positions, one substitution position and two additional positions. The modification position can be omitted if a combination of the two additional positions is employed as an indication that no modification is to be effected. The command word also comprises a five-position operation section consisting of one sign position, one marking position, one rounding-off position and two operation-code positions.

In some cases, the operation section can be further reduced and the address section correspondingly extended. The number of memory cells in the main memory AS therefore need not be increased. Generally the memory AS need not contain more memory cells because the memory, in practice, is never fully occupied by the program data stored. Nearly always a number of memory cells remain unoccupied and these can readily be employed as index register, thus requiring no increase in size or material.

There is, however, the possibility that no sufficient redundance is available in the operation-code section of the command word. This may happen, for example, with plural-address machines in which the command carries the addresses of a plurality of memory cells. If an increase in the digital positions of the command word is to be avoided in such circumstances, the address section must be shortended. The shortened address section then no longer identifies the entire memory. The actual address must then be built up in the processor system. This can be done, for example, by the following two methods.

(1) Each command is modified; that is, before execution of the command the shortened address section in the command word is supplemented by adding the content of an index register which stores an unshortened address section. All possible addresses of the memory can thus be formed.

(2) The address is composed in the address register in a manner similar to the formation of the address of the memory cells employed as index register. The address positions missing in the command word are stored in an additional register. This register need be recharged only rarely because the address positions kept in this register are small relative to the total address. The same expedients are applicable as with the method of building the full address of the index-register cells.

Figure 3:
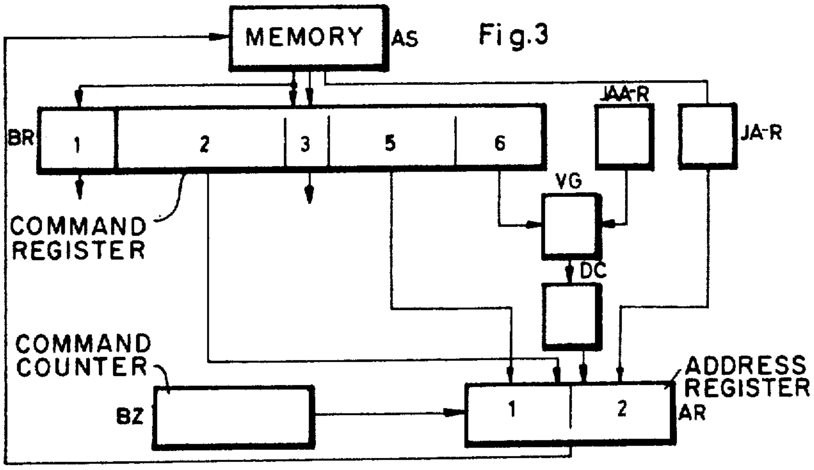
FIG. 3 is another embodiment of a processor system of the present invention.

In the embodiment according to FIG. 3, the index address register JA–R can be recharged automatically, that is without receiving a separately issued command. For this purpose, the command word contains a further number ($q$) of additional digit positions which are stored in the portion 6 of the command register BR. By means of these ($q$) digit positions, a number of cells in the memory can be designated whose stored data content determines the information stored in the index address register JA–R. Compared with the embodiment of FIG. 2, the embodiment of FIG. 3 is further provided with a register JAA–R in which the ($q$) further positions of the preceding command word are stored. The content of the register JAA–R is compared by a comparator VG with the stored content in portion 6 of the command register BR. The occurrence of coincidence has the meaning that the content of the index address register JA–R is not to be changed. In this case, the same operations take place as in the embodiment of FIG. 2. However, if the comparator VG ascertains lack of coincidence, this has the meaning that the index address register JA–R is to be newly charged, namely with the stored content of the cell in memory AS whose cell address is stored in coded form by portion 6 of the command register BR. In this case, the information stored in portion 6 of the command register BR is decoded with the aid of the decoding device DC and thus translated into the address of the memory cell whose stored content is to determine the new information of the index address register JA–R. This new address is transferred into the address register AR, the corresponding memory cell in the memory AS is occupied, and the corresponding positions of its stored content are taken into the index address register JA–R.

As a rule, a single change of the index address register JA–R will be sufficient for execution of a single command. However, a repeated change of the index address register JA–R can be obtained by newly charging at least the portion 6 in command register BR together with the index address register JA–R and taking the previously stored content of portion 6 into the register JAA–R. If the comparator VG then does not ascertain coincidence, the index address register JA–R is again varied in the manner described, and so forth. In practice, however, this is hardly ever necessary.

After completed change of the index address register JA–R, the same operations take place as in the embodiment of FIG. 2. In practice, the number of further digit positions ($q$) is very small, for example $q=1$ decimal position. Then, ten positions of the memory AS can be designated whose stored content is available for changing the information stored in the index address register JA–R. These ten possible digit values are not identical with the addresses of these memory cells which, of course, comprise many more digit positions, for example five address decimal positions. For that reason the decoding device DC is necessary in order to translate each of these digit values into a five-digit address.

Relative to the embodiment of FIG. 3 it is likewise not always necessary to increase the number of digit positions in the command word, for the same reasons as explained above with reference to the embodiment of FIG. 2. If $q=1$, for example, the command word may comprise a four-position operation section such as, for example, a combined sign and marking position, a rounding-off position and two operation-code positions, and a nine-position address section comprising five address positions, one substitution position, two ($m$) additional positions and one ($q$) further additional position. According to this example, 1000−10 memory cells can be employed as index register without requiring recharging of the index address register JA–R by separate command so that in practice a special recharging command for the index address register is hardly ever necessary. If desired, a shortening of the address section in the command word may also be applied as described with reference to FIG. 2.

Whether the embodiment of FIG. 2 or that of FIG. 3 is preferable depends upon the particular requirements, especially upon the type of the computing operations to be performed. Compared with FIG. 2, the embodiment of FIG. 3 has the advantage, for a given amount of equipment, that without recharging the index address register JA–R, any memory cells at respectively different localities of the memory AS can be employed as index register, whereas in the embodiment according to FIG. 2, without recharging the index address register JA–R, only memory cells at one location of the memory are applicable as index register.

In the memory cells employed as index register, those positions that are not needed for address modification, can be used for other purposes, if desired. For example, they can be used for indicating whether the entire cell or only given portions of the cell are to be read.

While in the foregoing the invention is described with reference to examples of single-address computers, it is analogously applicable to plural-address computers. In the latter case a corresponding plurality of the registers JA–R and JAA–R must be provided.

To those siklled in the art it will be obvious upon a study of this disclosure that my invention permits of a variety of modifications with respect to components and their interconnection and hence can be given embodiments other than particularly illustrated and described herein, without departing from the essential features of the invention and within the scope of the claims annexed hereto.

I claim:

1. A processor system with index registers for modifying the address section of command words for program-controlled digital computers, said processor system comprising a memory having memory cells of which a chosen number serve as index registers, a command register connected to said memory and having an operation-code portion and an address portion and an additional portion, said additional portion having a given number ($m$) of the total ($n$) digit positions in the address of said respective index-register cells of said memory, and an index address register apart from said memory and having the remaining number ($m-n$) of digit positions.

2. A processor system with index registers for modifying the address section of command words for program-controlled digital computers, said processor system comprising a main memory for connection to data input and output means having a multitude of data-storing memory cells of respectively different addresses, a number of said cells serving as index registers, a command register connected to said memory and having an operation-code portion and an address portion and an additional portion, said additional portion having a given number ($m$) of the total ($n$) digit positions in the address of said respective index-register cells of said memory, and index address register connected to said command register and having the remaining ($m-n$) digit positions of said respective addresses of said index-register cells, whereby the processor system in response to a modification-demanding command causes said additional portion of said command register to jointly provide with said index address register the address of the memory cell that is to serve as modifying index register.

3. A digital-computer processor system according to claim 2, wherein said number ($m$) of digit positions stored in said additional portion of said command register is constituted by the lower group of digit positions in the address of said index-register cells, and said remaining number ($n-m$) of digits constituting the upper digit positions of said latter address.

4. A digital-computer processor system according to claim 2, wherein said index-address register is rechargeable from said memory in response to charging command.

5. A processor system with index registers for modifying the address section of command words for program-controlled digital computers, said processor system comprising a main memory for connection to data input and output means having a multitude of data-storing memory cells of respectively different addresses, a number of said cells serving as index registers, a command register connected to said memory and having an operation-code portion and an address portion and first and second additional portions, said first additional portion having a number ($m$) of the total ($n$) digit positions in the address of said respective index-register cells of said memory, an index address register connected to said command register and having the remaining ($m-n$) digit position of said respective addresses of said index-register cells, whereby a modification-demanding command causes said first additional portion and said address index register to jointly provide the address of the memory cell that is to serve as modifying index register, said second additional portion of said command register having a further number ($q$) of command-word digit positions indicative of coded addresses of respective cells in said memory serving as altered contents for said address index register to permit charging said address index register from said latter cells.

6. A digital-computer processor system according to claim 5, further comprising an additional register containing stored the information corresponding to that of said further number ($q$) of command-word digit positions, and a comparator connected with said second additional portion of said command register and with said additional register for comparing said respective informations to cause recharging of said address index register from said latter memory cells when said informations are discrepant.

7. A digital computer processor system according to claim 2, wherein said number ($m$) of digit positions in the command word in said additional portion of said command register comprises coded information indicative as to whether or not modification of the address is demanded.

8. A digital computer processor system according to claim 2, further comprising additional register means, the command address in said address portion of said command register being incomplete, and said address portion being connected to said additional register means for completion of the command address by supplementation of digits from said latter register means.

No references cited.

ROBERT C. BAILEY, *Primary Examiner.*

R. B. ZACHE, *Assistant Examiner.*